(12) United States Patent
Dou et al.

(10) Patent No.: US 10,439,852 B2
(45) Date of Patent: Oct. 8, 2019

(54) SIGNAL PROCESSING APPARATUS, SIGNAL TRANSMITTING APPARATUS AND RECEIVER

(71) Applicant: FUJITSU LIMITED, Kawasaki (JP)

(72) Inventors: Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 423 days.

(21) Appl. No.: 15/135,905

(22) Filed: Apr. 22, 2016

(65) Prior Publication Data

US 2016/0315724 A1 Oct. 27, 2016

(30) Foreign Application Priority Data

Apr. 24, 2015 (CN) .......................... 2015 1 0202004

(51) Int. Cl.
*H04L 27/26* (2006.01)
*H04L 27/00* (2006.01)
(Continued)

(52) U.S. Cl.
CPC ....... *H04L 27/2601* (2013.01); *H04B 10/548* (2013.01); *H04J 14/0298* (2013.01);
(Continued)

(58) Field of Classification Search
CPC ............. H04L 27/2601; H04L 27/0014; H04L 27/2657; H04L 27/2697; H04L 5/0048;
(Continued)

(56) References Cited

U.S. PATENT DOCUMENTS

2002/0036714 A1* 3/2002 Markman ............. H04L 1/0036
348/607
2012/0177383 A1* 7/2012 Tanimura ............... H04B 10/61
398/158
(Continued)

FOREIGN PATENT DOCUMENTS

CN 102394714 A 3/2012
CN 102891824 A 1/2013

OTHER PUBLICATIONS

Magarini et al., Pilot-Symbols-Aided Carrier-Phase Recovery for 100-G PM-QPSK Digital Coherent Receivers, IEEE Photonics Technology Letters, vol. 24, No. 9, May 1, 2012, all pages.*
(Continued)

*Primary Examiner* — Oussama Roudani
(74) *Attorney, Agent, or Firm* — Staas & Halsey LLP (57) ABSTRACT

Embodiments of the present disclosure provide a signal processing apparatus, a signal transmitting apparatus and a receiver, which are adapted for a frequency division multiplexing system having a high-order modulation format. A receiver having a high-magnification sampling rate by inserting a pilot signal between neighboring subcarriers at a transmitter side, calculating a laser phase noise according to a phase of the pilot signal at a receiver side, and performing down-sampling and equalization processing after performing carrier phase recovery according to the laser phase noise, so that a laser phase noise having a wide frequency may be accurately compensated, thereby having a relatively powerful carrier phase recovery ability.

3 Claims, 6 Drawing Sheets

(51) Int. Cl.
  *H04L 5/00* (2006.01)
  *H04B 10/548* (2013.01)
  *H04J 14/02* (2006.01)
  *H04J 14/06* (2006.01)

(52) U.S. Cl.
  CPC ............ *H04J 14/06* (2013.01); *H04L 5/0048* (2013.01); *H04L 27/0014* (2013.01); *H04L 27/2657* (2013.01); *H04L 27/2697* (2013.01); *H04B 2210/075* (2013.01); *H04L 27/2672* (2013.01); *H04L 27/2675* (2013.01); *H04L 2027/004* (2013.01); *H04L 2027/0018* (2013.01); *H04L 2027/0087* (2013.01)

(58) Field of Classification Search
  CPC .... H04L 27/2672; H04B 10/548; H04J 14/06; H04J 14/0298
  See application file for complete search history.

(56) References Cited

U.S. PATENT DOCUMENTS

| | | | |
|---|---|---|---|
| 2014/0064102 A1* | 3/2014 | Pelekhaty | H04B 10/6162 370/241 |
| 2014/0072307 A1* | 3/2014 | Zamani | H04B 10/616 398/79 |
| 2015/0372766 A1* | 12/2015 | Yoshida | H04B 10/2507 398/193 |

OTHER PUBLICATIONS

Chinese Office Action dated Sep. 30, 2018 in corresponding Chinese Patent Application No. 201510202004.2.
Chinese Search Report dated Sep. 30, 2018 in corresponding Chinese Patent Application No. 201510202004.2.
Chinese Office Action dated Jan. 30, 2019 in Chinese Patent Application No. 201510202004.2.

* cited by examiner

SIGNAL PROCESSING APPARATUS, SIGNAL TRANSMITTING APPARATUS AND RECEIVER

CROSS-REFERENCE TO RELATED APPLICATIONS

This application claims the priority benefit of Chinese Patent Application No. 201510202004.2, filed on Apr. 24, 2015, in the Chinese State Intellectual Property Office, the disclosure of which is incorporated herein in its entirety by reference.

BACKGROUND

1. Field

The present disclosure relates to the field of communications, and in particular to a signal processing apparatus, a signal transmitting apparatus and a receiver.

2. Description of the Related Art

As the development of optical communication technologies, the appearance of coherent receivers and high-speed digital signal processing (DSP) technologies push forward continuous increase of capacities of optical communication systems, conventional binary on-off keying (OOK) modulation formats are continuously upgraded, and quadrature phase shift keying (QPSK), 16QAM (quadrature amplitude modulation) and QAM formats of higher orders appear.

On the other hand, as a flexible optical network can maximize resource configuration of the network, modulation formats capable of supporting resource allocation are favored by people. Currently, more attention is paid to the study of an orthogonal frequency division multiplexing (OFDM) modulation format. Although an OFDM system has a smaller scheduling force relative to a single-carrier system, it has some inherent defects. For example, neighboring channels are subjected to relatively large interference, and further improvement of spectrum utilization ratio is limited, etc. For a frequency division multiplexing (FDM) modulation format of a broader sense, when its spectrum is strictly limited, a problem of spectrum spreading may be avoided, and widths of subcarriers may be flexibly adjusted at the same time. Thus, the FDM technology has a wider application prospect.

In an FDM system, the orders of the modulation formats of the subcarriers are relatively high. In a case where the same bit error rate is reached, a high-order modulation format not only has a relatively high requirement on an optical signal to noise ratio in a link, but also a descending tolerance for a phase noise of a laser. Hence, the phase noise of the laser needs to be compensated, so as to recover a carrier phase. Currently, there is not effective method for compensating for a phase noise of a laser for an FDM system to recover a carrier phase. Furthermore, for an OFDM system, multi-frame signals of received signals need to be obtained in a time domain, and changes of phases of the multi-frame signals need to be analyzed. Therefore, down-sampling and equalization processing need to be performed first on the received signals.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

The above existing method in the related art is not applicable to a frequency division multiplexing (FDM) system of a high-order modulation format, and when the above existing method used for an OFDM system is used to perform carrier phase recovery on received signals at a receiver side, as down-sampling and equalization processing need to be performed first on the received signals, it is not applicable to a receiver having a high power sampling rate.

Embodiments of the present disclosure provide a signal processing apparatus, a signal transmitting apparatus and a receiver, which are adapted for a frequency division multiplexing system having a high-order modulation format and a receiver having a high power sampling rate, and a laser phase noise having a broadband may be accurately compensated, thereby having a relatively powerful carrier phase recovery ability.

According to a first aspect of embodiments of the present disclosure, there is provided a signal processing apparatus used for a frequency division multiplexing system, including: an extracting unit configured to extract a pilot signal in received signals; a calculating unit configured to calculate a laser phase noise in the frequency division multiplexing system according to a phase of the pilot signal; a recovering unit configured to perform carrier phase recovery on the received signals according to the received signals and the laser phase noise; and a processing unit configured to perform down-sampling and equalization processing on the received signals after the recovering unit performs carrier phase recovery on the received signals.

According to a second aspect of embodiments of the present disclosure, there is provided a signal transmitting apparatus used for a frequency division multiplexing system, including: an inserting unit configured to insert a pilot signal between neighboring subcarriers in a frequency domain; and a transmitting unit configured to transmit subcarrier signals with the pilot signal being inserted.

According to a third aspect of embodiments of the present disclosure, there is provided a receiver, including the signal processing apparatus according to the first aspect of the embodiments of the present disclosure.

An advantage of embodiments of the present disclosure exists in that by inserting a pilot signal between neighboring subcarriers at a transmitter side, calculating a laser phase noise according to a phase of the pilot signal at a receiver side, and performing down-sampling and equalization processing after performing carrier phase recovery according to the laser phase noise, it is adapted for a frequency division multiplexing system having a high-order modulation format and a receiver having a high power sampling rate, and a laser phase noise having a broadband may be accurately compensated, thereby having a relatively powerful carrier phase recovery ability.

With reference to the following description and drawings, the particular embodiments of the present disclosure are disclosed in detail, and the principle of the present disclosure and the manners of use are indicated. It should be understood that the scope of embodiments of the present disclosure is not limited thereto. Embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/includes" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
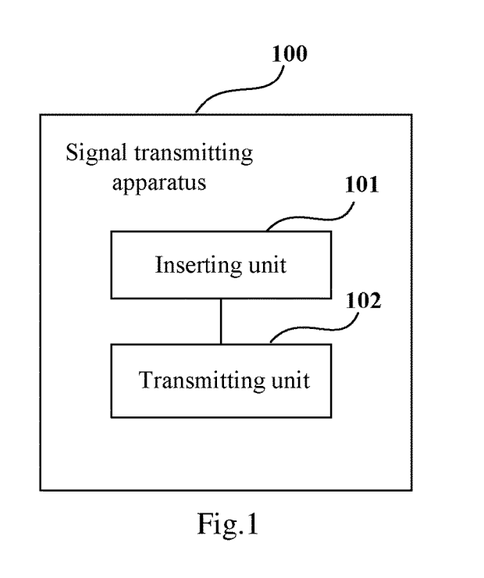
FIG. 1 is a schematic diagram of a structure of the signal transmitting apparatus of Embodiment 1 of the present disclosure.

An embodiment of the present disclosure provides a signal transmitting apparatus used for an FDM system, which is applicable to a transmitter side of the FDM system. FIG. 1 is a schematic diagram of a structure of the signal transmitting apparatus of Embodiment 1 of the present disclosure. As shown in FIG. 1, the apparatus 100 includes: an inserting unit 101 and a transmitting unit 102.

The inserting unit 101 is configured to insert a pilot signal between neighboring subcarriers in a frequency domain, and the transmitting unit 102 is configured to transmit subcarrier signals with the pilot signal being inserted.

It can be seen from the above embodiment that by inserting a pilot signal between neighboring subcarriers at a transmitter side so as to calculate a laser phase noise according to a phase of the pilot signal at a receiver side, it is adapted for a frequency division multiplexing system having a high-order modulation format and a receiver having a high power sampling rate, and a laser phase noise having a broadband may be accurately compensated, thereby having a relatively powerful carrier phase recovery ability.

In this embodiment, the inserting unit 101 may insert the pilot signal in different manners according to whether the FDM system is a single-polarization system or a dual-polarization system; for example, for a single-polarization FDM system, the inserting unit 101 inserts a pilot signal between at least one pair of neighboring subcarriers in the frequency domain; and for a dual-polarization FDM system, the inserting unit 101 inserts a pilot signal between at least one pair of neighboring subcarriers respectively for different polarization states in the frequency domain, or inserts a pilot signal between at least one pair of neighboring subcarriers in the frequency domain.

In this embodiment, the inserting unit 101 may insert a pilot signal between a pair of neighboring subcarriers, and may also insert pilot signals respectively between two or more pairs of neighboring subcarriers.

In this embodiment, description is given taking that the inserting unit 101 respectively inserts a pilot signal between a pair of neighboring subcarriers at different polarization states as an example. However, embodiments of the present disclosure are not limited to this manner of insertion.

In this embodiment, the subcarriers of the transmission signals of the FDM system may be various subcarriers. For example, a modulated spectrum of each subcarrier may in a rectangular shape, that is, a Nyquist time domain shaping pulse of a very small roll-off factor is adopted. Hence, a spectrum utilization ratio may be improved.

Figure 2:
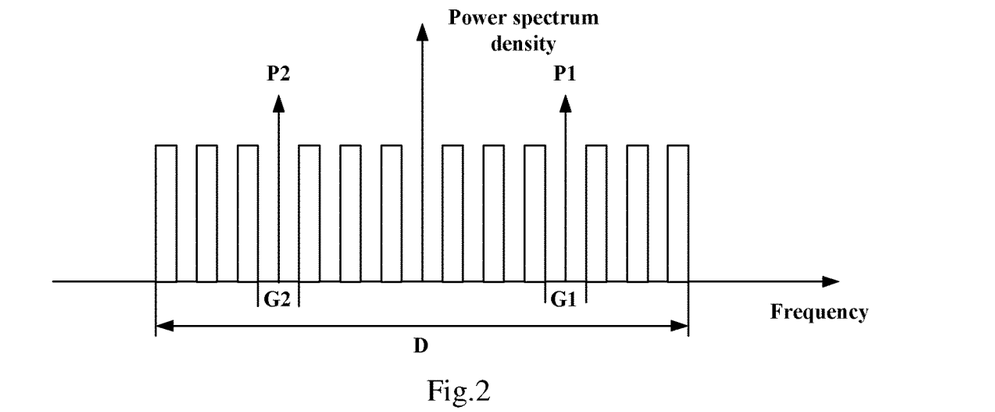
FIG. 2 is a frequency spectrogram of transmission signals with pilot signals being inserted of Embodiment 1 of the present disclosure.

FIG. 2 is a spectral diagram of transmission signals with pilot signals being inserted of Embodiment 1 of the present disclosure. As shown in FIG. 2, the transmission signals have multiple subcarriers in a whole bandwidth D. For the H polarization state, a pilot signal P1 is inserted between a pair of neighboring subcarriers, and for the V polarization state, another pilot signal P2 is inserted between another pair of neighboring subcarriers.

In this embodiment, as the laser phase noise of the FDM system will lead to spectrum broadening of the signals, and the laser phase noise will generally increase along with increase of a line width of the laser, a frequency interval between the neighboring subcarriers in which a pilot signal is inserted is determined according to the line width of the laser of the FDM system. For example, when the line width of the laser is relatively large, a relatively large frequency interval will be correspondingly provided.

Hence, by providing the frequency interval between the neighboring subcarriers in which a pilot signal is inserted determined according to the line width of the laser, accuracy of estimating and compensating the laser phase noise may further be improved.

For example, as shown in FIG. 2, the frequency interval between the neighboring subcarriers in which the pilot signal P1 is inserted is G1, and the frequency interval between the neighboring subcarriers in which the pilot signal P2 is inserted is G2, both G1 and G2 being determined according to the line width of the laser of the FDM system, which being identical to each other, or being different from each other.

In this embodiment, power of the pilot signal may be determined according to at least one of an order of a modulation format, a line width of a laser, or an optical signal to noise ratio of a link, of the FDM system.

For example, the higher the order of the modulation format, the more complex the modulation signals, and the higher the power of the pilot signal; and the higher the power of the pilot signal, the more accurate of the estimation of the laser phase noise, but the larger the influence to the signal to noise ratio. Thus, the power of the pilot signal may be determined according to the order of the modulation format, the line width of the laser, and the optical signal to noise ratio of the link, of the FDM system.

Furthermore, in this embodiment, the power of the pilot signal may be set as being greater than power of the subcarriers, so as to facilitate extract the pilot signal to be analyzed at the receiver side.

In this embodiment, the transmitting unit 102 transmits the subcarrier signals with the pilot signal being inserted. In this embodiment, the subcarrier signals with the pilot signal being inserted may be transmitted in an existing manner. For example, the signals may be modulated and then inputted into a transmission link of the FDM system.

It can be seen from the above embodiment that by inserting a pilot signal between neighboring subcarriers at a transmitter side so as to calculate a laser phase noise according to a phase of the pilot signal at a receiver side, it is adapted for a frequency division multiplexing system having a high-order modulation format and a receiver having a high power sampling rate, and a laser phase noise having a broadband may be accurately compensated, thereby having a relatively powerful carrier phase recovery ability.

Embodiment 2

Figure 3:
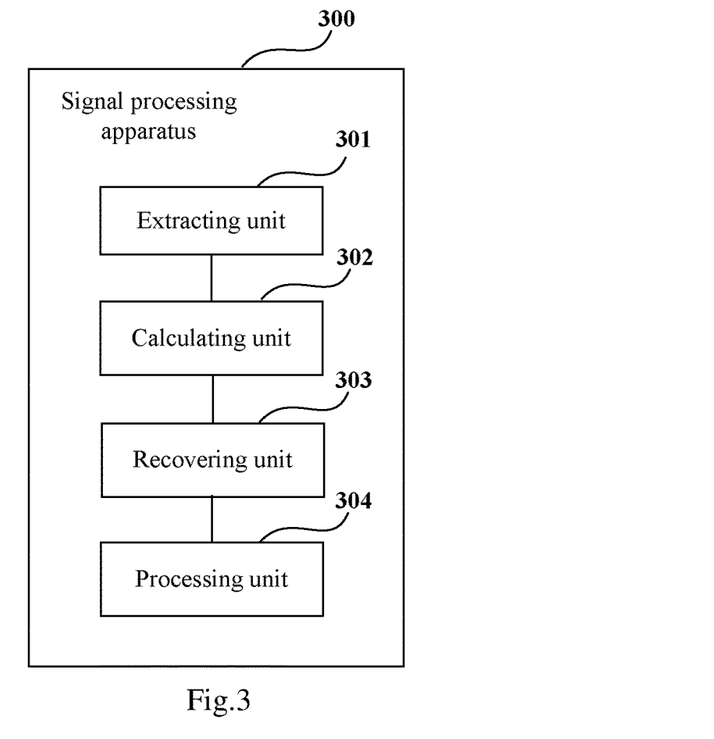
FIG. 3 is a schematic diagram of a structure of the signal processing apparatus of Embodiment 2 of the present disclosure.

An embodiment of the present disclosure further provides a signal processing apparatus used for an FDM system, which is applicable to a receiver side of the FDM system. FIG. 3 is a schematic diagram of a structure of the signal processing apparatus of Embodiment 2 of the present disclosure. As shown in FIG. 3, the apparatus 300 includes: an extracting unit 301, a calculating unit 302, a recovering unit 303 and a processing unit 304.

The extracting unit 301 is configured to extract a pilot signal in received signals; the calculating unit 302 is configured to calculate a laser phase noise in the frequency division multiplexing system according to a phase of the pilot signal; the recovering unit 303 is configured to perform carrier phase recovery on the received signals according to the received signals and the laser phase noise; and the processing unit 304 is configured to perform down-sampling and equalization processing on the received signals after the recovering unit performs carrier phase recovery on the received signals.

It can be seen from the above embodiment that by inserting a pilot signal between neighboring subcarriers at a transmitter side, calculating a laser phase noise according to a phase of the pilot signal at a receiver side, and performing down-sampling and equalization processing after performing carrier phase recovery according to the laser phase noise, it is adapted for a frequency division multiplexing system having a high-order modulation format and a receiver having a high power sampling rate, and a laser phase noise having a broadband may be accurately compensated, thereby having a relatively powerful carrier phase recovery ability.

In this embodiment, the received signals refer to signals received at the receiver and after the transmission signals at the transmitter side pass through the transmission link in an FDM system. In this embodiment, the transmission signals may be transmitted by the signal transmitting apparatus described in Embodiment 1. For example, the transmission signals have the frequency spectrogram shown in FIG. 2, and shall not be described herein any further.

In this embodiment, the extracting unit 301 is configured to extract the pilot signal in the received signals. A structure of the extracting unit 301 and a method for extracting a pilot signal shall be illustrated below.

Figure 4:
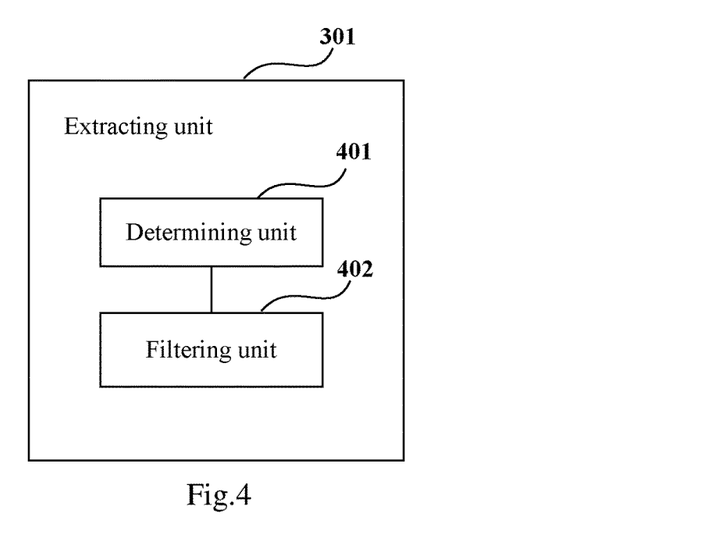
FIG. 4 is a schematic diagram of a structure of the extracting unit 301 of Embodiment 2 of the present disclosure.

FIG. 4 is a schematic diagram of a structure of the extracting unit 301 of Embodiment 2 of the present disclosure. As shown in FIG. 4, the extracting unit 301 includes: a determining unit 401 configured to determine a bandwidth for filtering according to a frequency interval between two subcarriers neighboring the pilot signal in a frequency domain in transmitting the pilot signal; and a filtering unit 402 configured to filter the received signals near a frequency point of the pilot signal according to the bandwidth for filtering, so as to extract the pilot signal.

In this embodiment, the determining unit 401 determines the bandwidth for filtering according to the frequency interval between the two subcarriers neighboring the pilot signal in the frequency domain in transmitting the pilot signal. For example, the bandwidth for filtering increases along with increase of the frequency interval.

In this embodiment, the frequency interval between the two subcarriers neighboring the pilot signal in the frequency domain in transmitting the pilot signal may be determined by using the method described in Embodiment 1, and shall not be described herein any further.

In this embodiment, the filtering unit 402 filters the received signals near the frequency point of the pilot signal according to the bandwidth for filtering, so as to extract the pilot signal. In this embodiment, as power of the pilot signal in the received signals is set as being greater than power of the subcarriers, the frequency point of the pilot signal may be determined by searching a maximum value of a power spectrum density of a spectrum of the received signals.

In this embodiment, the spectrum of the received signals may be obtained by using an existing method. For example, imbalance effect compensation is first performed on the received signals, and then Fourier transform is performed on the received signals, so as to obtain the spectrum of the received signals. In this embodiment, for an FDM system of dual polarization states, Fourier transform is performed on the received signals in the H polarization state and in the V polarization state respectively, so as to obtain the spectra of the received signals in the two polarization states.

In this embodiment, the filtering unit 402 may perform filtering by using an existing structure and method. For example, the filtering unit 402 may be a narrowband filter, a bandwidth of the narrowband filter being slightly less than the frequency interval between the two subcarriers neighboring the pilot signal in the frequency domain in transmitting the pilot signal.

In this embodiment, after the extracting unit 301 extracts the pilot signal in the received signals, the calculating unit 302 calculates the laser phase noise in the FDM system according to the phase of the pilot signal. A structure of the calculating unit 302 and a method for calculating the laser phase noise shall be illustrated below.

Figure 5:
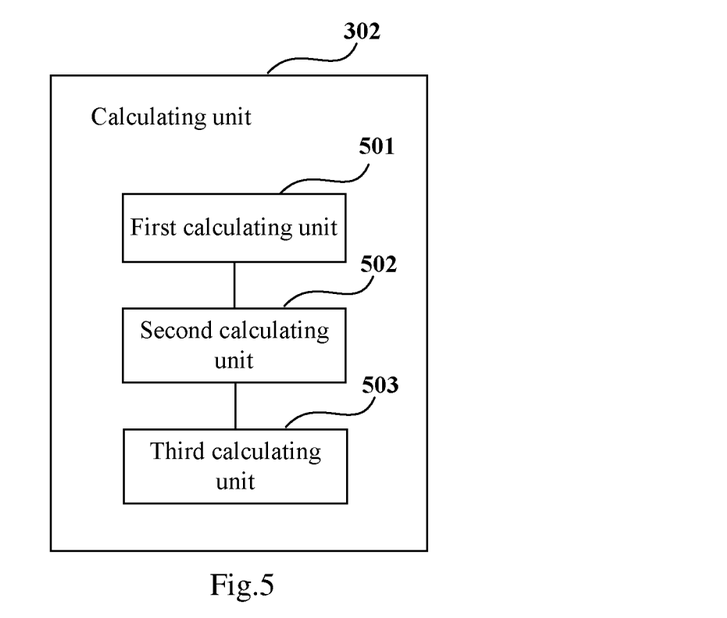
FIG. 5 is a schematic diagram of a structure of the calculating unit 302 of Embodiment 2 of the present disclosure.

FIG. 5 is a schematic diagram of a structure of the calculating unit 302 of Embodiment 2 of the present disclosure. As shown in FIG. 5, the calculating unit 302 includes: a first calculating unit 501 configured to calculate a pilot component matrix of the received signals in two polarization states according to complex amplitude at frequency points of two pilot signals in the two polarization states; a second calculating unit 502 configured to multiply time domain signals of the received signals by an inverse matrix of the pilot component matrix, so as to obtain polarization demultiplexed signals; and a third calculating unit 503 configured to extract phases of the two pilot signals from the polarization demultiplexed signals, and calculate the laser phase noise according to the phases of the two pilot signals.

In this embodiment, the complex amplitude at frequency points of two pilot signals in the two polarization states may be obtained by performing Fourier transform on received time domain signals. In this embodiment, an existing Fourier transform method may be used, such as a Fourier transform method having a sliding window.

In this embodiment, for example, at the transmitter side, the two polarization states are an H polarization state and a V polarization state, and pilot signals in the two polarization states are denoted by PilotH and PilotV; at the receiver side, the two polarization states are an X polarization state and a Y polarization state; and a pilot component matrix H of the received signals in the two polarization states may be expressed by Equation (1) below:

$$H = \begin{bmatrix} h_{11} & h_{12} \\ h_{21} & h_{22} \end{bmatrix};\qquad(1)$$

where, h11 denotes a component of the PilotH in the X polarization state, h12 denotes a component of the PilotV in the X polarization state, h21 denotes a component of the PilotH in the Y polarization state, and h22 denotes a component of the PilotV in the Y polarization state.

In this embodiment, the second calculating unit 502 multiplies the time domain signals of the received signals by the inverse matrix H−1 of the pilot component matrix, so as to obtain polarization demultiplexed signals.

In this embodiment, the third calculating unit 503 extracts the phases of the two pilot signals from the polarization demultiplexed signals, and calculates the laser phase noise according to the phases of the two pilot signals. For example, the third calculating unit 503 removes a frequency difference from the extracted phases of the two pilot signals, and obtains the laser phase noise after averaging.

In this embodiment, at the transmitter side, a pilot signal may be inserted between a pair of neighboring subcarriers, and pilot signals may also be inserted respectively between two or more pairs of neighboring subcarriers. When pilot signals are inserted respectively between two or more pairs of neighboring subcarriers, at the receiver side, the extracting unit 301 and the calculating unit 302 may respectively extract and calculate the pilot signals, so as to obtain multiple laser phase noises, average the multiple laser phase noises, and take the average value as the laser phase noise of the FDM system.

In this embodiment, the recovering unit 303 is configured to perform carrier phase recovery on the received signals according to the received signals and the laser phase noise. For example, the recovering unit 303 may subtract the received time domain signals by the laser phase noise, so as to perform carrier phase recovery.

In this embodiment, the processing unit 304 performs down-sampling and equalization processing on the received signals after the recovering unit 303 performs carrier phase recovery on the received signals. In this embodiment, an existing method may be adopted for performing down-sampling and equalization processing on the received signals.

Hence, as down-sampling and equalization processing are performed after the carrier phase recovery, it is adapted for a receiver having a high power sampling rate, thereby compensating for a laser phase noise having a wide frequency.

It can be seen from the above embodiment that by inserting a pilot signal between neighboring subcarriers at a transmitter side, calculating a laser phase noise according to a phase of the pilot signal at a receiver side, and performing down-sampling and equalization processing after performing carrier phase recovery according to the laser phase noise, it is adapted for a frequency division multiplexing system having a high-order modulation format and a receiver having a high power sampling rate, and a laser phase noise having a broadband may be accurately compensated, thereby having a relatively powerful carrier phase recovery ability.

Embodiment 3

Figure 6:
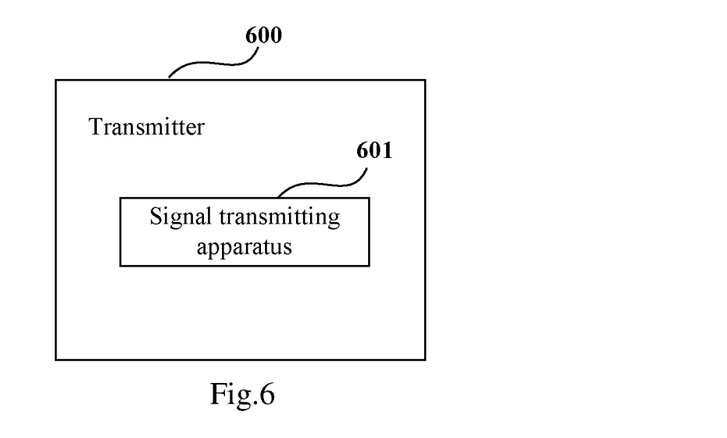
FIG. 6 is a schematic diagram of a structure of the transmitter of Embodiment 3 of the present disclosure.

An embodiment of the present disclosure further provides a transmitter. FIG. 6 is a schematic diagram of a structure of the transmitter of Embodiment 3 of the present disclosure. As shown in FIG. 6, the transmitter 600 includes a signal transmitting apparatus 601, a structure and functions of the signal transmitting apparatus 601 being identical to those described in Embodiment 1, and being not going to be described herein any further.

Figure 7:
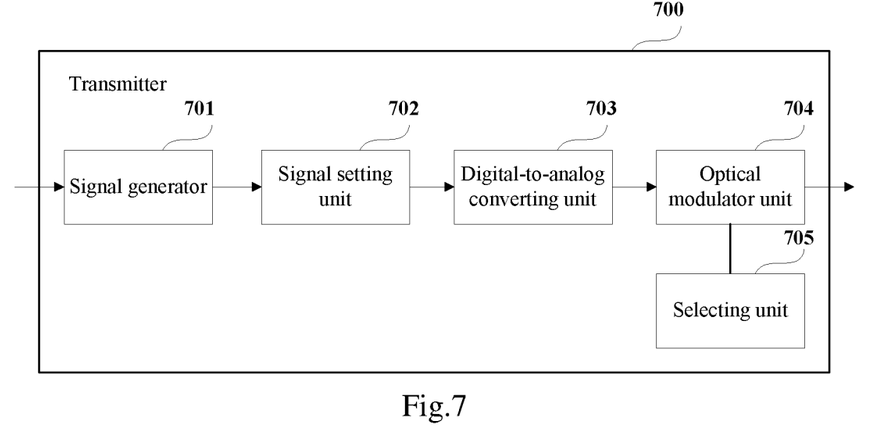
FIG. 7 is a block diagram of a systematic structure of the transmitter of Embodiment 3 of the present disclosure.

FIG. 7 is a block diagram of a systematic structure of the transmitter of Embodiment 3 of the present disclosure. As show in FIG. 7, the transmitter 700 includes: a signal generator 701, a signal setting unit 702, a digital-to-analog converting unit 703 and an optical modulator unit 704.

The signal generator 701 generates digital signals according to transmission data, the signal setting unit 702 inserts a pilot signal into the generated digital signals in the manner described in Embodiment 1, that is, inserting a pilot signal between neighboring subcarriers in a frequency domain, the digital-to-analog converting unit 703 performs digital-to-analog conversion on the digital signals, and the optical modulator unit 704 performs optical modulation by taking the signals converted by the digital-to-analog converting unit 703 as modulation signals. Furthermore, a selecting unit 705 may be included, and the optical modulator unit 704 performs signal modulation according to codewords selected by the selecting unit 705, so that frequencies of pilot signals in different polarization states are different.

It can be seen from the above embodiment that by inserting a pilot signal between neighboring subcarriers at a transmitter side so as to calculate a laser phase noise according to a phase of the pilot signal at a receiver side, it is adapted for a frequency division multiplexing system having a high-order modulation format and a receiver having a high power sampling rate, and a laser phase noise having a broadband may be accurately compensated, thereby having a relatively powerful carrier phase recovery ability.

Embodiment 4

Figure 8:
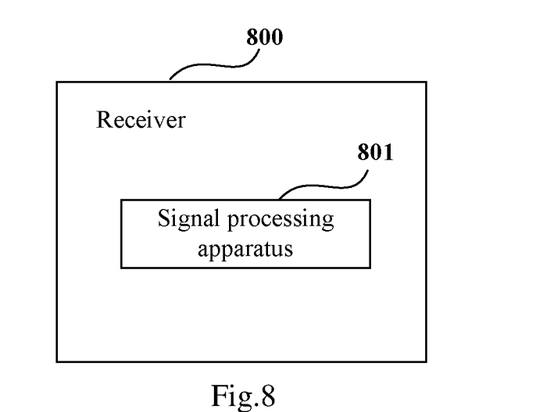
FIG. 8 is a schematic diagram of a structure of the receiver of Embodiment 4 of the present disclosure.

An embodiment of the present disclosure further provides a receiver. FIG. 8 is a schematic diagram of a structure of the receiver of Embodiment 4 of the present disclosure. As shown in FIG. 8, the receiver 800 includes a signal processing apparatus 801, a structure and functions of the signal processing apparatus 801 being identical to those described in Embodiment 2, and being not going to be described herein any further.

Figure 9:
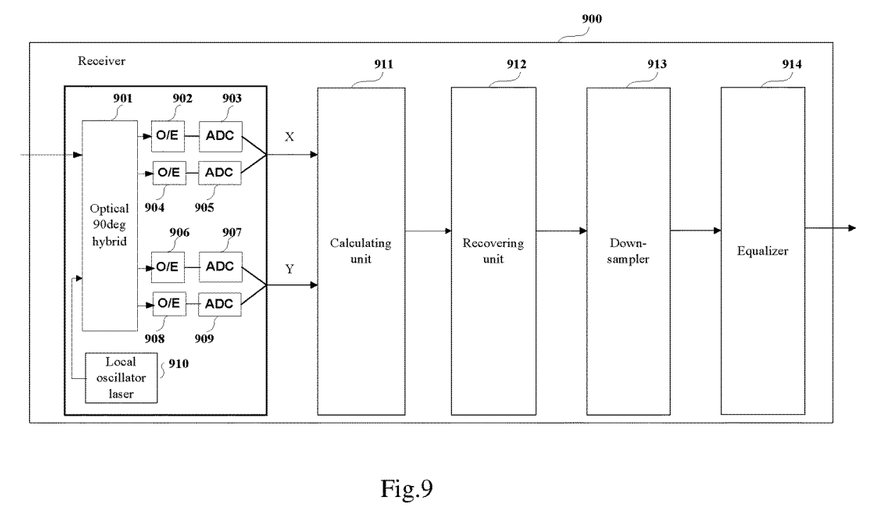
FIG. 9 is a block diagram of a systematic structure of the receiver of Embodiment 4 of the present disclosure.

FIG. 9 is a block diagram of a systematic structure of the receiver of Embodiment 4 of the present disclosure. As show in FIG. 9, the receiver 900 includes: a front end configured to convert inputted optical signals into baseband signals in two polarization states. In the embodiment of the present disclosure, the two polarization states may include an H polarization state and a V polarization state.

As show in FIG. 9, the front end includes: an local oscillator laser 910, an optical 90 deg hybrid 901, optoelectronic (O/E) detectors 902, 904, 906 and 908, analog-to-digital converters (ADCs) 903, 905, 907 and 909, a calculating unit 911, a recovering unit 912, a down-sampler 913 and an equalizer 914. In this embodiment, modules constituted by the optical 90 deg hybrid 901, optoelectronic (O/E) detectors 902, 904, 906 and 908, analog-to-digital converters (ADCs) 903, 905, 907 and 909 may correspond to the extracting unit 301 in Embodiment 2, the calculating unit 911 and recovering unit 912 may correspond to the calculating unit 302 and the recovering unit 303 in Embodiment 2, respectively, and the down-sampler 913 and equalizer 914 may correspond to the processing unit 304 in Embodiment 2, with their structures and functions being identical to those described in Embodiment 2, and being not going to be described herein any further. The local oscillator laser 910 is configured to provide a local power supply, and optical signals are converted into baseband signals in the X polarization state after passing through the optical 90 deg hybrid 901, the optoelectronic (O/E) detectors 902 and 904 and the analog-to-digital converters (ADCs) 903 and 905, and are converted into baseband signals in the Y polarization state after passing through the optical 90 deg hybrid 901, the optoelectronic (O/E) detectors 906 and 908 and the analog-to-digital converters (ADCs) 907 and 909; and a particular process of implementation is similar to that in the related art, and shall not be described herein any further.

It can be seen from the above embodiment that by inserting a pilot signal between neighboring subcarriers at a transmitter side, calculating a laser phase noise according to a phase of the pilot signal at a receiver side, and performing down-sampling and equalization processing after performing carrier phase recovery according to the laser phase noise, it is adapted for a frequency division multiplexing system having a high-order modulation format and a receiver having a high power sampling rate, and a laser phase noise having a broadband may be accurately compensated, thereby having a relatively powerful carrier phase recovery ability.

Embodiment 5

Figure 10:
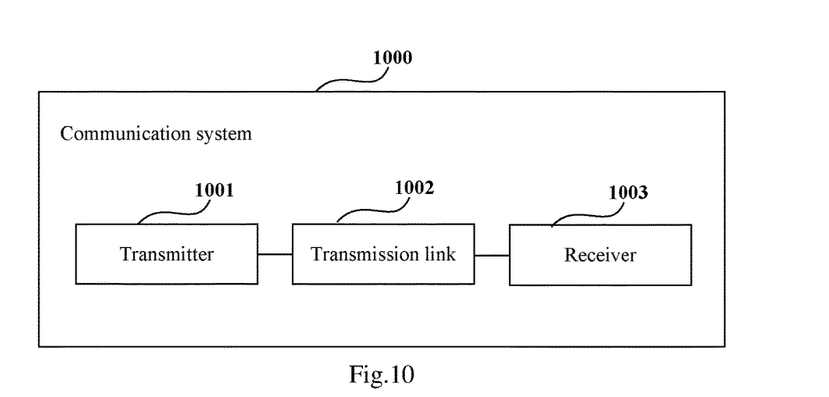
FIG. 10 is a schematic diagram of a structure of the communication system of Embodiment 5 of the present disclosure.

An embodiment of the present disclosure further provides a communication system. FIG. 10 is a schematic diagram of a structure of the communication system of Embodiment 5 of the present disclosure. As shown in FIG. 10, the communication system 1000 includes a transmitter 1001, a transmission link 1002 and a receiver 1003. In this embodiment, a structure and functions of the transmitter 1001 are identical to those described in Embodiment 3, and a structure and functions of the receiver 1003 are identical to those described in Embodiment 4, which shall not be describe herein any further. And the transmission link 1002 may have a structure and functions of an existing transmission link, and the structure and functions of the transmission link are not limited in embodiments of the present disclosure.

It can be seen from the above embodiment by inserting a pilot signal between neighboring subcarriers at a transmitter side, calculating a laser phase noise according to a phase of the pilot signal at a receiver side, and performing down-sampling and equalization processing after performing carrier phase recovery according to the laser phase noise, it is adapted for a frequency division multiplexing system having a high-order modulation format and a receiver having a high power sampling rate, and a laser phase noise having a broadband may be accurately compensated, thereby having a relatively powerful carrier phase recovery ability.

Embodiment 6

Figure 11:
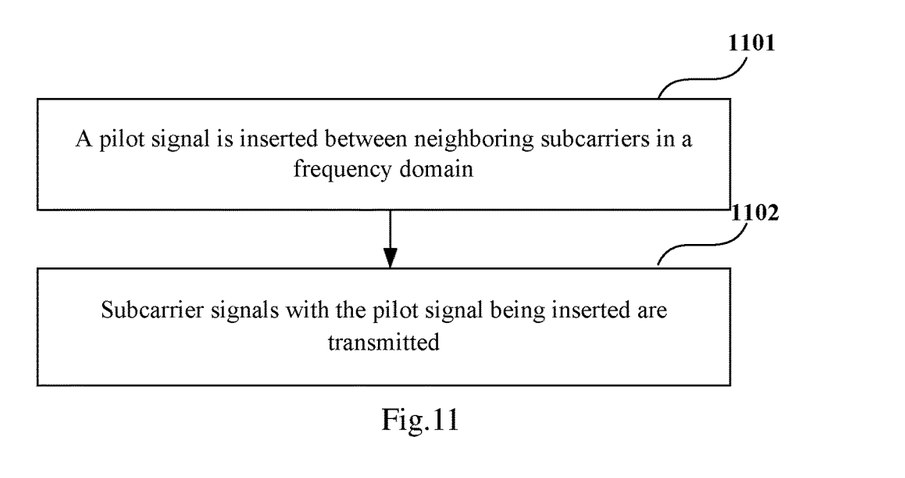
FIG. 11 is a flowchart of the signal transmitting method of Embodiment 6 of the present disclosure.

An embodiment of the present disclosure further provides a signal transmitting method used for an FDM system, corresponding to the signal transmitting apparatus of Embodiment 1. FIG. 11 is a flowchart of the signal transmitting method of Embodiment 6 of the present disclosure. As shown in FIG. 11, the method includes: Step 1101: a pilot signal is inserted between neighboring subcarriers in a frequency domain; and Step 1102: subcarrier signals with the pilot signal being inserted are transmitted.

In this embodiment, a method for inserting the pilot signal and a method for transmitting subcarrier signals are identical to those described in Embodiment 1, which shall not be described herein any further.

It can be seen from the above embodiment that by inserting a pilot signal between neighboring subcarriers at a transmitter side so as to calculate a laser phase noise according to a phase of the pilot signal at a receiver side, it is adapted for a frequency division multiplexing system having a high-order modulation format and a receiver having a high power sampling rate, and a laser phase noise having a broadband may be accurately compensated, thereby having a relatively powerful carrier phase recovery ability.

Embodiment 7

Figure 12:
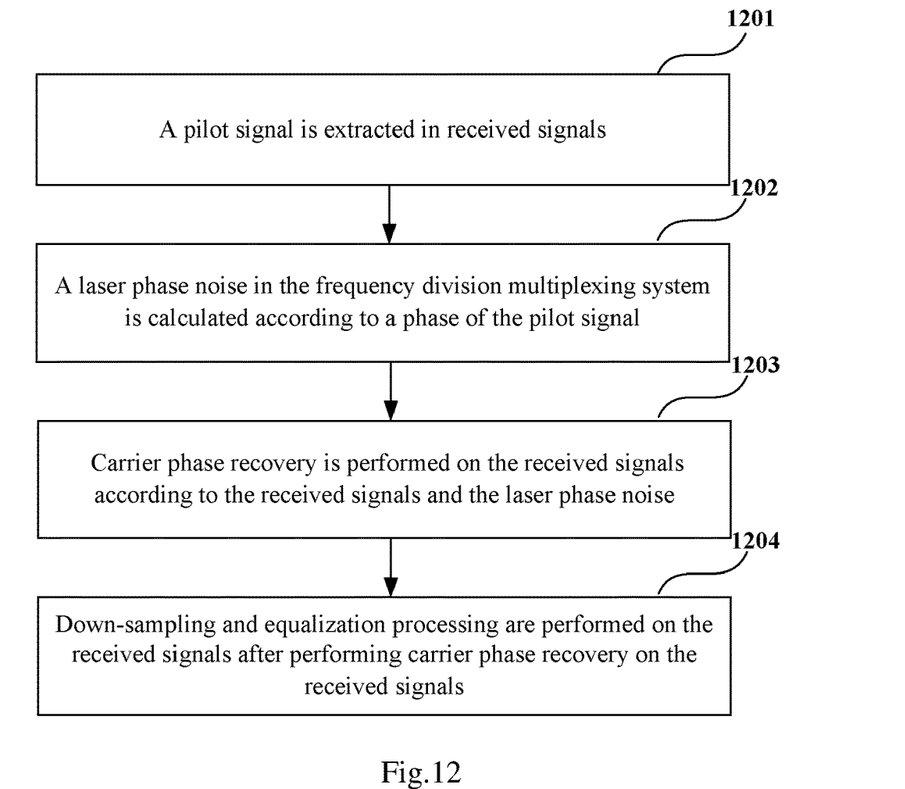
FIG. 12 is a flowchart of the signal processing method of Embodiment 7 of the present disclosure.

An embodiment of the present disclosure further provides a signal transmitting method used for an FDM system, corresponding to the signal transmitting apparatus of Embodiment 2. FIG. 12 is a flowchart of the signal transmitting method of Embodiment 7 of the present disclosure.

As shown in FIG. 12, the method includes: Step 1201: a pilot signal is extracted in received signals; Step 1202: a laser phase noise in the frequency division multiplexing system is calculated according to a phase of the pilot signal; Step 1203: carrier phase recovery is performed on the received signals according to the received signals and the laser phase noise; and Step 1204: down-sampling and equalization processing are performed on the received signals after performing carrier phase recovery on the received signals.

In this embodiment, a method for extracting a pilot signal, a method for calculating a laser phase noise, a method for performing carrier phase recovery, and a method for performing down-sampling and equalization processing are identical to those described in Embodiment 2, which shall not be described herein any further.

It can be seen from the above embodiment that by inserting a pilot signal between neighboring subcarriers at a transmitter side, calculating a laser phase noise according to a phase of the pilot signal at a receiver side, and performing down-sampling and equalization processing after performing carrier phase recovery according to the laser phase noise, it is adapted for a frequency division multiplexing system having a high-order modulation format and a receiver having a high power sampling rate, and a laser phase noise having a broadband may be accurately compensated, thereby having a relatively powerful carrier phase recovery ability.

An embodiment of the present disclosure further provides a computer-readable program, wherein when the program is executed in a signal transmitting apparatus or a transmitter, the program enables a computer to carry out the signal transmitting method as described in Embodiment 6 in the signal transmitting apparatus or the transmitter.

An embodiment of the present disclosure further provides a computer-readable program, wherein when the program is executed in a signal processing apparatus or a receiver, the program enables a computer to carry out the signal processing method as described in Embodiment 7 in the signal processing apparatus or the receiver.

An embodiment of the present disclosure provides a storage medium in which a computer-readable program is stored, wherein the computer-readable program enables a computer to carry out the signal transmitting method as described in Embodiment 6 in a signal transmitting apparatus or a transmitter.

An embodiment of the present disclosure provides a storage medium in which a computer-readable program is stored, wherein the computer-readable program enables a computer to carry out the signal processing method as described in Embodiment 7 in a signal processing apparatus or a receiver.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

For the implementation of the present disclosure containing the above embodiments, following supplements are further disclosed.

Supplement 1. A signal processing apparatus used for a frequency division multiplexing system, including: an extracting unit configured to extract a pilot signal in received signals; a calculating unit configured to calculate a laser phase noise in the frequency division multiplexing system according to a phase of the pilot signal; a recovering unit configured to perform carrier phase recovery on the received signals according to the received signals and the laser phase noise; and a processing unit configured to perform down-sampling and equalization processing on the received signals after the recovering unit performs carrier phase recovery on the received signals.

Supplement 2. The apparatus according to supplement 1, wherein the extracting unit includes: a determining unit configured to determine a bandwidth for filtering according to a frequency interval between two subcarriers neighboring the pilot signal in a frequency domain in transmitting the pilot signal; and a filtering unit configured to filter the received signals near a frequency point of the pilot signal according to the bandwidth for filtering, to extract the pilot signal.

Supplement 3. The apparatus according to supplement 1, wherein the frequency division multiplexing system is a dual-polarization frequency division multiplexing system, and the calculating unit includes: a first calculating unit configured to calculate a pilot component matrix of the received signals in two polarization states according to complex amplitude at frequency points of two pilot signals in the two polarization states; a second calculating unit configured to multiply time domain signals of the received signals by an inverse matrix of the pilot component matrix, to obtain polarization demultiplexed signals; and a third calculating unit configured to extract phases of the two pilot signals from the polarization demultiplexed signals, and calculate the laser phase noise according to the phases of the two pilot signals.

Supplement 4. A signal transmitting apparatus used for a frequency division multiplexing system, including: an inserting unit configured to insert a pilot signal between neighboring subcarriers in a frequency domain; and a transmitting unit configured to transmit subcarrier signals with the pilot signal being inserted.

Supplement 5. The apparatus according to supplement 4, wherein, for a single-polarization frequency division multiplexing system, the inserting unit inserts a pilot signal between at least one pair of neighboring subcarriers in the frequency domain; and for a dual-polarization frequency division multiplexing system, the inserting unit inserts a pilot signal between at least one pair of neighboring subcarriers respectively for different polarization states in the frequency domain, or inserts a pilot signal between at least one pair of neighboring subcarriers in the frequency domain.

Supplement 6. The apparatus according to supplement 4, wherein a frequency interval between the neighboring subcarriers in which a pilot signal is inserted is determined according to a line width of a laser of the frequency division multiplexing system.

Supplement 7. The apparatus according to supplement 4, wherein power of the pilot signal is determined according to at least one of an order of a modulation format, a line width of a laser, or an optical signal to noise ratio of a link, of the frequency division multiplexing system.

Supplement 8. A receiver, including the apparatus as described in any one of supplements 1-3.

Supplement 9. A transmitter, including the apparatus as described in any one of supplements 4-7.

Supplement 10. A communication system, including the receiver as described in supplement 8 and the transmitter as described in supplement 9.

Supplement 11. A signal processing method used for a frequency division multiplexing system, including: extracting a pilot signal in received signals; calculating a laser phase noise in the frequency division multiplexing system according to a phase of the pilot signal; performing carrier phase recovery on the received signals according to the received signals and the laser phase noise; and performing down-sampling and equalization processing on the received signals after the recovering unit performs carrier phase recovery on the received signals.

Supplement 12. The method according to supplement 11, wherein the extracting a pilot signal in received signals includes: determining a bandwidth for filtering according to a frequency interval between two subcarriers neighboring the pilot signal in a frequency domain in transmitting the pilot signal; and filtering the received signals near a frequency point of the pilot signal according to the bandwidth for filtering, to extract the pilot signal.

Supplement 13. The method according to supplement 11, wherein the frequency division multiplexing system is a dual-polarization frequency division multiplexing system, and the calculating a laser phase noise in the frequency division multiplexing system according to a phase of the pilot signal includes: calculating a pilot component matrix of the received signals in two polarization states according to complex amplitude at frequency points of two pilot signals in the two polarization states; multiplying time domain signals of the received signals by an inverse matrix of the pilot component matrix, to obtain polarization demultiplexed signals; and extracting phases of the two pilot signals from the polarization demultiplexed signals, and calculating the laser phase noise according to the phases of the two pilot signals.

Supplement 14. A signal transmitting method used for a frequency division multiplexing system, including: inserting a pilot signal between neighboring subcarriers in a frequency domain; and transmitting subcarrier signals with the pilot signal being inserted.

Supplement 15. The method according to supplement 14, wherein the inserting a pilot signal between neighboring subcarriers in a frequency domain includes: for a single-polarization frequency division multiplexing system, inserting a pilot signal between at least one pair of neighboring subcarriers in the frequency domain; and for a dual-polarization frequency division multiplexing system, inserting a pilot signal between at least one pair of neighboring subcarriers respectively for different polarization states in the frequency domain, or inserting a pilot signal between at least one pair of neighboring subcarriers in the frequency domain.

Supplement 16. The method according to supplement 14, wherein a frequency interval between the neighboring subcarriers in which a pilot signal is inserted is determined according to a line width of a laser of the frequency division multiplexing system.

Supplement 17. The method according to supplement 14, wherein power of the pilot signal is determined according to at least one of an order of a modulation format, a line width of a laser, or an optical signal to noise ratio of a link, of the frequency division multiplexing system.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A signal processing apparatus used for a frequency division multiplexing system, comprising:
   a memory that stores a plurality of instructions;
   a processor that couples to the memory and causes the signal processing apparatus to:
      extract a pilot signal inserted between neighboring subcarriers in a frequency domain in received signals,
      calculate a laser phase noise in the frequency division multiplexing system according to a phase of the pilot signal,
      perform carrier phase recovery on the received signals according to the received signals and the laser phase noise, and
      perform down-sampling and equalization processing on the received signals after performing carrier phase recovery on the received signals,
   wherein the frequency division multiplexing system is a dual-polarization frequency division multiplexing system, and the calculating of the laser phase noise in the frequency division multiplexing system according to the phase of the pilot signal comprises:
      calculating a pilot component matrix of the received signals in two polarization states according to complex amplitude at frequency points of two pilot signals in the two polarization states,
      multiplying time domain signals of the received signals by an inverse matrix of the pilot component matrix, to obtain polarization demultiplexed signals, and
      extracting phases of the two pilot signals from the polarization demultiplexed signals, and calculating the laser phase noise according to the phases of the two pilot signals.

2. A receiver, comprising the signal processing apparatus as claimed in claim 1.

3. The signal processing apparatus according to claim 1, wherein the extracting of the pilot signal inserted between the neighboring subcarriers in the frequency domain in received signals comprises:
   determining a bandwidth for filtering according to a frequency interval between two subcarriers neighboring the pilot signal in a frequency domain in transmitting the pilot signal, and filtering the received signals near a frequency point of the pilot signal according to the bandwidth for filtering, to extract the pilot signal.

* * * * *